(12) United States Patent
Guillen et al.

(10) Patent No.: US 8,229,054 B2
(45) Date of Patent: Jul. 24, 2012

(54) METHODS FOR ABSORBING NEUTRONS

(75) Inventors: Donna P. Guillen, Idaho Falls, ID (US); Glen R. Longhurst, Idaho Falls, ID (US); Douglas L. Porter, Idaho Falls, ID (US); James R. Parry, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 355 days.

(21) Appl. No.: 12/184,136

(22) Filed: Jul. 31, 2008

(65) Prior Publication Data

US 2010/0027732 A1    Feb. 4, 2010

(51) Int. Cl.
*G21C 19/42*    (2006.01)

(52) U.S. Cl. .................. 376/340; 376/327; 250/518.1

(58) Field of Classification Search ............... 376/340, 376/327; 250/518.1
See application file for complete search history.

(56) References Cited

U.S. PATENT DOCUMENTS

| | | | | |
|---|---|---|---|---|
| 4,227,967 A * | 10/1980 | Zebroski | ............... | 376/219 |
| 4,826,630 A * | 5/1989 | Radford et al. | ............... | 252/478 |
| 4,898,709 A * | 2/1990 | Clayton | ............... | 376/159 |
| 5,630,786 A * | 5/1997 | Griffin et al. | ............... | 600/3 |
| 6,674,829 B1 * | 1/2004 | Skold | ............... | 376/346 |
| 6,678,344 B2 * | 1/2004 | O'Leary et al. | ............... | 376/170 |
| 2005/0105667 A1 * | 5/2005 | Kim et al. | ............... | 376/202 |

FOREIGN PATENT DOCUMENTS

KR    10-0435226    *    6/1994

OTHER PUBLICATIONS

Chung et al., "Utilization and Facility of Neutron Activation Analysis in HANARO Research Reactor," 6th Meeting of International Group on Research Reactors, Apr. 29-May 1, 1998, Taejon, Korea, pp. 231-243.* http://dictionary.reference.com/browse/so+that, accessed Nov. 8, 2010.*

Guillen et al., "In-Pile Experiment of a New Hafnium Aluminide composite Material to Enable Fast Neutron Testing in the Advanced Test Reactor," ICAPP '10, Jun. 2010, Idaho National Laboratory, INL/CON-10-17879, 8 pages.

Wampler et al., "Fabrication and Characterization of a Conduction Cooled Thermal Neutron Filter," Proceedings of ICAPP '10, San Diego, CA, Jun. 13-17, 2010, Paper 10118, 8 pages.

* cited by examiner

*Primary Examiner* — Ricardo Palabrica
(74) *Attorney, Agent, or Firm* — TraskBritt

(57) ABSTRACT

A conduction cooled neutron absorber may include a metal matrix composite that comprises a metal having a thermal neutron cross-section of at least about 50 barns and a metal having a thermal conductivity of at least about 1 W/cm·K. Apparatus for providing a neutron flux having a high fast-to-thermal neutron ratio may include a source of neutrons that produces fast neutrons and thermal neutrons. A neutron absorber positioned adjacent the neutron source absorbs at least some of the thermal neutrons so that a region adjacent the neutron absorber has a fast-to-thermal neutron ratio of at least about 15. A coolant in thermal contact with the neutron absorber removes heat from the neutron absorber.

19 Claims, 6 Drawing Sheets

METHODS FOR ABSORBING NEUTRONS

GOVERNMENT RIGHTS

This invention was made with government support under Contract No. DE-AC07-05ID-14517 awarded by the United States Department of Energy. The government has certain rights in the invention.

TECHNICAL FIELD

This invention relates to nuclear reactor systems in general and, more specifically, to systems and methods for providing large neutron fluxes and high fast-to-thermal neutron ratios.

BACKGROUND

It is often desirable in nuclear reactor systems to produce large or substantial neutron fluxes and high fast-to-thermal neutron ratios, either in order to test and analyze the performance of new reactor fuels and materials in such environments or to otherwise operate nuclear reactor systems under "fast-flux" radiation conditions. One method for testing materials under fast-flux radiation conditions is to place the materials in a reactor and expose them to fast neutrons. More particularly, it is often desirable to conduct such testing under conditions of high fast-to-thermal neutron ratios (e.g., ratios of about 15 or greater) as well as at large or substantial neutron flux intensities (e.g., $1 \times 10^{15}$ n/cm$^2$·s or greater). Unfortunately, these neutron energy and flux conditions place conflicting technical requirements on the configuration and operational parameters of the reactor system.

For example, the requirement for a high fast-to-thermal neutron ratio (e.g., in excess of 15) typically requires the absence of significant neutron thermalizer between the neutron source and the target material. In addition, neutron "filters" may need to be provided to remove or filter low energy or thermal neutrons from the neutron flux. The requirement for a high neutron flux intensity (e.g., in excess of $10^{15}$ n/cm$^2$·s) typically results in substantial heating of the target material being studied, and may involve the use of booster fuels that further add to the heat load. In addition, such high flux intensities will result in additional heating of the neutron filter, e.g., from the (n,γ) absorption reactions, which additional heat must also be somehow removed from the apparatus.

While numerous types of cooling systems are known and may be used for this purpose, they too, present conflicting design requirements. For example, while gas cooling systems are known and may be used, they must be operated at substantial pressures and flow rates in order to remove the excessive heat generated as a result of the high neutron flux intensities. Past experience has indicated that gas cooling systems are expensive and difficult to operate in such regimes. While molten metal and molten salt cooling systems are also known and may be used, they are not without their problems. For example, the use of liquid metals and salts may present safety concerns if they are reactive with the primary coolant being used in the test reactor. Moreover, such molten coolants (e.g., either metals or salts), must be maintained in the molten state in order to avoid structural damage to the system. Water cooled systems are also known and could be used. However, water is a highly effective neutron thermalizer, and thus serves to lower the fast-to-thermal neutron flux ratio.

Consequently, the task of designing a reactor system suitable for exposing materials to high fast-to-thermal neutron flux ratios and at high flux intensities is by no means trivial and presents a number of conflicting technical and economic requirements that must be resolved in order to arrive at a successful system.

SUMMARY

One embodiment of a conduction cooled neutron absorber according to the teachings provided herein may include a metal matrix composite that comprises a metal having a thermal neutron cross-section of at least about 50 barns and a metal having a thermal conductivity of at least about 1 W/cm·K.

Also disclosed is a method for producing a conduction cooled neutron absorber that comprises providing a powder mixture comprising a first powder component having a high thermal neutron cross-section and a second powder component having a high thermal conductivity; and consolidating the powder mixture to form the conduction cooled neutron absorber.

One embodiment of an apparatus for providing a neutron flux having a high fast-to-thermal neutron ratio according to the teachings provided herein may include a source of neutrons that produces fast neutrons and thermal neutrons. A neutron absorber positioned adjacent the neutron source absorbs at least some of the thermal neutrons so that a region adjacent the neutron absorber has a fast-to-thermal neutron ratio of at least about 15. A coolant in thermal contact with the neutron absorber removes heat from the neutron absorber.

A method for absorbing neutrons according to the teachings provided herein may include positioning a neutron absorber in a neutron field, the neutron absorber comprising a first material having a high thermal neutron cross-section dispersed within a second material having a high thermal conductivity; allowing neutrons from the neutron field to penetrate the neutron absorber, the neutron absorber absorbing at least some of the neutrons; and contacting a portion of the neutron absorber with a coolant, the coolant removing heat from the neutron absorber.

BRIEF DESCRIPTION OF THE DRAWINGS

Illustrative and presently preferred embodiments of the invention are shown in the accompanying drawings in which.

DETAILED DESCRIPTION

Figure 1:
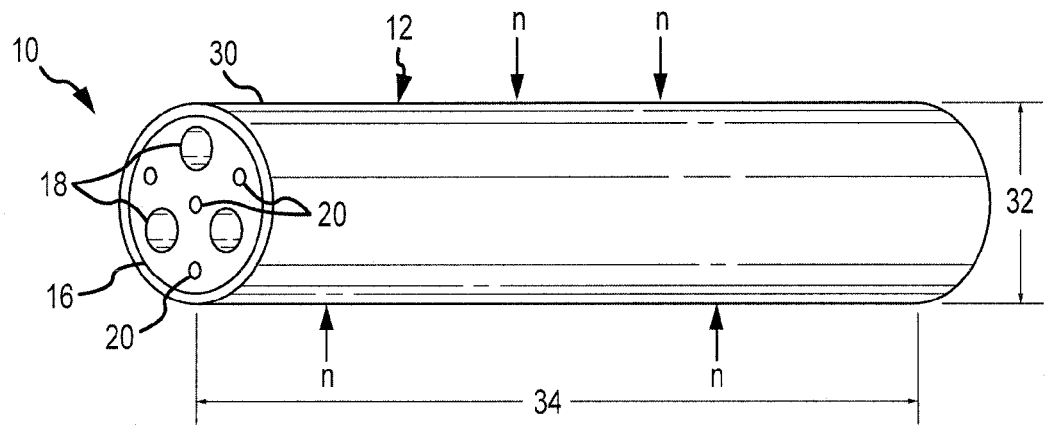
FIG. 1 is a perspective view of one embodiment of a conduction cooled neutron absorber as it may be utilized in a generally cylindrically shaped test cell.
Figure 2:
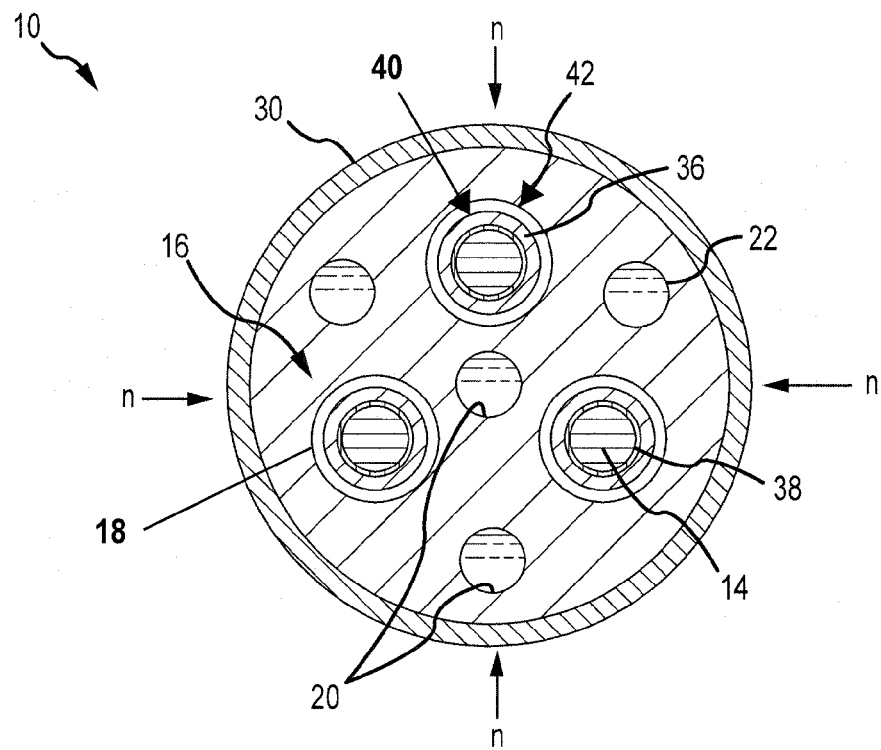
FIG. 2 is an end view of the conduction cooled neutron absorber illustrated in FIG. 1.

One embodiment of a conduction cooled neutron absorber 10 is best seen in FIGS. 1 and 2 and may comprise a portion of a test cell 12 that is configured to hold a quantity of target or sample material 14 (FIG. 2) that is to be exposed to neutron radiation. More specifically, the test cell 12 is configured to be received by a test reactor (not shown) that produces or generates neutrons (shown schematically in FIGS. 1 and 2 as "n") that are used to irradiate the target material 14. In the embodiment illustrated in FIGS. 1 and 2, the conduction cooled neutron absorber 10 takes the form of a generally elongate, cylindrical structure 16 having a plurality of bores 18 provided therein that is sized to receive the target or sample material 14. The conduction cooled neutron absorber 10 may also be provided with one or more cooling channels 20 therein through which are caused to flow a coolant 22 (FIG. 2) to remove heat generated as a result of neutron exposure. Alternatively, the conduction cooled neutron absorber 10 may comprise other shapes and configurations, as will be described in further detail below.

In the various embodiments shown and described herein, the conduction cooled neutron absorber 10 is formed from a composite material that comprises various constituents that provide the conduction cooled neutron absorber 10 with certain advantageous properties and characteristics, some of which are described herein and others of which will become apparent to persons having ordinary skill in the art after having become familiar with the teachings provided herein. In one embodiment, the composite material comprises a first material or constituent having a large thermal neutron cross-section that is dispersed within a second material or constituent having a high thermal conductivity. Examples of the first material include any of a wide range of hafnium intermetallic phases, such as hafnium aluminide ($Al_3Hf$). An example of the second material includes aluminum. The resulting composite material (e.g., containing hafnium aluminide intermetallic phase in aluminum) allows the conduction cooled neutron absorber 10 to provide high fast-to-thermal neutron ratios (e.g., as a result of the effective removal or filtering of thermal neutrons by the hafnium) while simultaneously allowing high neutron fluxes to be achieved without overheating (e.g., by the rapid and efficient transfer of heat to the coolant 22 by the aluminum).

Figure 6:
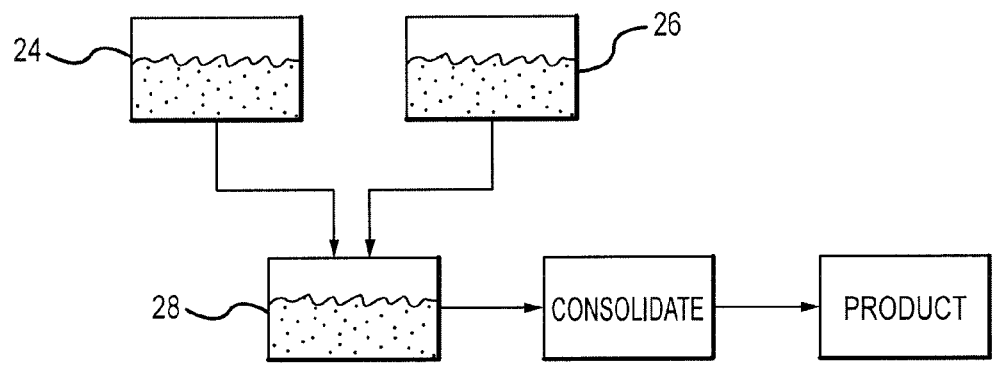
FIG. 6 is a schematic process diagram of a method for producing a conduction cooled neutron absorber.

Referring now primarily to FIG. 6, a conduction cooled neutron absorber 10 (FIGS. 1 and 2) comprising the aluminum/hafnium composite material described herein may be produced or fabricated by mixing together hafnium aluminide powder 24 with aluminum powder 26 to form a powder mixture 28. The resulting powder mixture 28 may then be consolidated (e.g., by pressing or by extruding) in order to form a neutron absorber 10 having the desired configuration. Alternatively, other fabrication methods may be used, as will be described in further detail herein.

As already mentioned, the conduction cooled neutron absorber 10 may comprise a portion of a test cell 12 that is configured to be placed within a reactor (not shown), so that the target or sample material 14 contained within the conduction cooled neutron absorber 10 will be exposed to a neutron field produced or generated by the reactor. Generally speaking, the neutron field produced by the reactor will comprise neutrons "n" (FIGS. 1 and 2) having a wide range of energies. Neutrons having energies below about 0.68 electron volts (eV) are referred to herein as "thermal" neutrons, whereas neutrons having energies greater than about 0.1 million electron volts (MeV) are referred to herein as "fast" neutrons.

In the example applications shown and described herein, it is desired to test the target material 14 under "fast flux" conditions, i.e., under comparatively high neutron flux intensities and wherein the ratio of fast-to-thermal neutrons is high. More specifically, it is generally desired to expose the material 14 contained within the bores 18 of conduction cooled neutron absorber 10 to neutron flux intensities of at least about $1\times10^{15}$ neutrons per square centimeter-second ($n/cm^2 \cdot s$), and wherein the fast-to-thermal neutron ratio is at least about 15. That is, the neutron flux should comprise about 15 times as many fast neutrons as thermal neutrons. Indeed, and as will be described in further detail herein, computer modeling of various example configurations of the conduction cooled neutron absorber 10 indicates that high neutron flux intensities having fast-to-thermal neutron ratios as high as 50 can be readily achieved.

The target material 14 may be irradiated by such "fast flux" neutrons by placing the sample material 14 within the bore(s) 18 provided within the conduction cooled neutron absorber 10. The resulting test cell assembly 12 may then be positioned within the reactor (not shown) and exposed to the neutron field. Once inserted into the reactor, neutrons "n" travel through the conduction cooled neutron absorber 10 before reaching the target material 14 contained therein. The hafnium provided within the conduction cooled neutron absorber 10 absorbs thermal neutrons, thereby increasing the fast-to-thermal ratio of neutrons "n" that ultimately reach the sample material 14. Heat resulting from the irradiation of the sample material 14, as well as heat generated by the neutron absorption reactions (e.g., (n,γ) reactions) occurring in the conduction cooled neutron absorber 10, is conducted primarily by the aluminum in the neutron absorber 10 to the cooling channels 20, whereupon it is transferred to the coolant 22.

A significant advantage of the present invention is that it may be utilized to produce (e.g., by thermal neutron filtering) neutron radiation having high fast-to-thermal neutron ratios. The high fast-to-thermal neutron ratios achievable with the present invention are due primarily to the composition of the conduction cooled neutron absorber 10. More specifically, the hafnium in the hafnium aluminide intermetallic portion of the conduction cooled neutron absorber 10 has a large thermal neutron cross-section and is highly effective in absorbing significant quantities of low energy or thermal neutrons in the neutron flux generated by the reactor. Consequently, any of a wide range of fast-to-thermal neutron ratios may be achieved by designing the conduction cooled neutron absorber 10 so that an appropriate amount of hafnium (e.g., in the form of hafnium aluminide) is positioned between the neutron source and the target material 14.

As already mentioned, neutron fields having high flux intensities typically involve the generation of significant amounts of heat. For example, significant quantities of heat may be generated within the target material 14 being tested, particularly where the target material 14 comprises a fuel. In addition, the hafnium contained within the conduction cooled neutron absorber 10 may also produce significant quantities of heat as a result of the capture of thermal neutrons. The heat produced by these heat sources is rapidly and efficiently conducted to the coolant 22 by the aluminum component of the conduction cooled neutron absorber 10. Consequently, the temperature of the sample material 14, as well as the temperature of the conduction cooled neutron absorber 10 itself, may be more easily maintained within desired ranges or below a predetermined maximum temperature.

Another advantage of the present invention is that the superior thermal conductivity of the material forming the conduction cooled neutron absorber 10 allows the coolant channels 20 to be located farther away from the sample target material 14 than would otherwise be the case, i.e., compared to materials having lower thermal conductivities. Consequently, the present invention allows for water to be used as a coolant, even though water is not normally used as a coolant in such applications because it is a highly effective neutron thermalizer. That is, even though the coolant 22 may thermalize a significant number of neutrons "n," the overall adverse effect on the fast-to-thermal neutron ratio is reduced because the coolant 22 may be located farther away from the target material 14 being tested. The increased distance between the coolant 22 and the target material 14 allows the hafnium contained within the conduction cooled neutron absorber 10 to absorb or filter more of the thermal neutrons produced by the coolant 22. In addition, the high thermal conductivity of the conduction cooled neutron absorber 10 will allow lesser quantities of water coolant to be used, thereby further enhancing the ability to produce neutron fluxes having high fast-to-thermal neutron ratios.

Still yet other advantages are associated with the present invention. For example, the powder metallurgy process for dispersing the hafnium intermetallic material (e.g., hafnium aluminide) within the aluminum matrix allows hafnium to be readily incorporated in aluminum, even though hafnium itself is not readily soluble in aluminum. The hafnium/aluminum composite material is also stable, both during fabrication and irradiation, and is resistant to corrosion. Moreover, the powder metallurgy techniques described herein may also allow the material to be formed into any of a wide variety of shapes and configurations.

Having briefly described one embodiment of a conduction cooled neutron absorber 10 according to the present invention, as well as some of its more significant features and advantages, various exemplary embodiments of conduction cooled neutron absorbers, methods for producing "fast-flux" neutron fields, and methods for fabricating neutron absorbers will now be described in detail. However, before proceeding with the detailed description, it should be noted that the various embodiments of the conduction cooled neutron absorbers are shown and described herein as they could be used in test cell assemblies for exposing sample or target material 14 to fast-flux radiation fields produced by a test reactor. However, the present invention is not limited to such applications, and could instead be used in any of a wide range of applications wherein it is desired to filter thermal neutrons (e.g., to produce neutron fluxes having high fast-to-thermal neutron ratios) and/or wherein it is desired to provide high thermal conductivities. Consequently, the present invention should not be regarded as limited to the particular configurations and environments shown and described herein.

Referring back now to FIGS. 1 and 2, a first embodiment of a conduction cooled neutron absorber 10 is shown and described herein as it may comprise a part or portion of a test cell 12 that is designed to expose sample material 14 to a fast-flux neutron field. More specifically, and in the embodiments shown and described herein, the test cell 12 is configured to be used in conjunction with the Advanced Test Reactor located near Idaho Falls, Id., and operated by the U.S. Department of Energy's Idaho National Laboratory. Basically, the Advanced Test Reactor comprises a "four leaf clover" core design that provides a plurality of test spaces or regions suitable for receiving materials to be tested. The Advanced Test Reactor is capable of producing neutron fields having extreme neutron fluxes, thereby allowing materials to be exposed in a few weeks or months to neutron radiation that would take years in a typical commercial reactor.

Because the particular embodiments shown and described herein are intended to be used in the Advanced Test Reactor, certain aspects (e.g., the overall size and shape) of the test cell 12, as well as the conduction cooled neutron absorber 10 contained therein, are based on requirements imposed by the particular test reactor, as opposed to any special requirements of using the invention. However, the particular requirements imposed by the desired use with the Advanced Test Reactor will become readily apparent to persons having ordinary skill in the art after having become familiar with the teachings provided herein. Consequently, the present invention should not be regarded as limited to conduction cooled neutron absorbers having the particular sizes, configurations, or other design aspects specified herein that are required for the particular application.

In accordance with the desired use of the conduction cooled neutron absorber 10 in the Advanced Test Reactor, the conduction cooled neutron absorber 10 comprises a generally cylindrically shaped bulk material structure or heat sink portion 16 of the test cell 12. The conduction cooled neutron absorber 10 may be provided with one or more bores 18 therein for receiving the sample or test material 14, as well as one or more coolant channels 20 for receiving coolant 22. In one embodiment, the conduction cooled neutron absorber 10 is surrounded or encapsulated by a pressure tube 30. Pressure tube 30 allows the pressure exerted by the pressurized coolant 22 flowing in coolant channels 20 to be borne by the pressure tube 30 rather than by the conduction cooled neutron absorber 10. In addition, encapsulation of the conduction cooled neutron absorber 10 by the pressure tube 30 allows the test cell 12 to be more easily handled as a self-contained component that can be readily placed within the test reactor.

Pressure tube 30 may comprise any of a wide range of materials and have any of a wide range of thicknesses suitable for the intended application, as would become apparent to persons having ordinary skill in the art after having become familiar with the teachings provided herein. Consequently, the present invention should not be regarded as limited to a pressure tube 30 comprising any particular material or thickness. However, by way of example, in one embodiment, the pressure tube 30 is fabricated from INCONEL® 600 and has a thickness of about 3.175 mm (about 0.125 inch).

In the particular embodiments shown and described herein, the cylindrically shaped bulk material structure 16 of the conduction cooled neutron absorber 10 may have an overall diameter 32 of about 7.3 cm (about 3.386 inches) and an overall length 34 of about 1.22 m (about 48 inches). Each of the bores 18 may have a diameter of about 3.17 cm (about 1.25 inches) and may be arranged generally evenly (e.g., at intervals of 120°) around the geometric center of the cylindrically shaped structure 16. Alternatively, other configurations are possible, some of which are shown and described herein and others of which will become apparent to persons having ordinary skill in the art after having become familiar with the teachings provided herein. Consequently, the present invention should not be regarded as limited to conduction cooled neutron absorbers having any particular configuration.

As already mentioned, the conduction cooled neutron absorber 10 may also be provided with one or more coolant channels 20 therein through which are caused to flow a coolant 22. Coolant 22 removes heat resulting from the neutron radiation (e.g., heat resulting from the neutron irradiation of the sample material 14 as well as from the absorption of neutrons by the conduction cooled neutron absorber 10). In the embodiments shown and described herein, the coolant 22 may comprise water, although other coolants, such as molten salts or liquid metals, may also be used. In the first embodiment, four coolant channels 20 of conduction cooled neutron absorber 10 are provided at the locations best seen in FIGS. 1 and 2. By way of example, each of the coolant channels 20 may have a diameter of about 6.35 mm (about 0.25 inch). Alternatively, other arrangements and configurations are possible, as will be described in greater detail below.

The sample material 14 may be provided within the various bores 18 provided in the conduction cooled neutron absorber 10. Any of a wide variety of configurations and arrangements are possible for providing the sample material 14 in the bores 18, some of which are described herein and others of which will become apparent to persons having ordinary skill in the art after having become familiar with the teachings provided herein. Consequently, the present invention should not be regarded as limited to any particular configuration and arrangement for providing the sample material 14 within the bores 18. However, by way of example, in one embodiment, the sample material 14 may be surrounded by a jacket 36. Depending on the particular application and the heat loads expected, a thermal bonding agent 38 may be provided between the material 14 and the jacket 36 in order to improve the heat transfer between the material 14 and jacket 36.

Jacket 36 may comprise any of a wide range of materials suitable for the intended application, as would become apparent to persons having ordinary skill in the art after having become familiar with the teachings provided herein. Consequently, the present invention should not be regarded as limited to any particular jacket 36 (or even to the presence of such a jacket 36). However, by way of example, in one embodiment, the jacket 36 may comprise INCONEL® 600. Examples of suitable thermal bonding agents 38 include liquid metals or salts, although other materials may be used.

It may also be desirable to size the overall sample assembly 40 (i.e., the sample material 14, jacket 36, and thermal bonding agent 38) so that an annulus 42 is defined between the jacket 36 of sample assembly 40 and bore 18. Annulus 42 may receive a temperature control gas (not shown), such as a mixture of helium and neon, to act as a thermal interface between the sample material 14 and the conduction cooled neutron absorber 10. Alternatively, such an annulus 42 need not be provided. Instead, the jacket 36 could be sized to contact some or all of the interior surface of bore 18 to provide direct contact for heat transfer, as will be described in further detail below.

Before proceeding with the description, it should be noted that the particular configuration of the sample assembly 40, i.e., whether the sample material 14 will be provided with a jacket 36, a thermal bonding agent 38, and/or be sized so as to define an annulus 42 between the jacket 36 and bore 18 will depend on a wide range of factors, such as, for example, the type of sample material 14 that is to be used, the particular heat loads expected, the coefficient of thermal expansion of the sample material 14, the particular coolant 22 to be used, and other factors, as would become apparent to persons having ordinary skill in the art after having become familiar with the teachings provided herein. Moreover, because the particular configuration and structural arrangement of the sample assembly 40 is not particularly critical in achieving the various objects and advantages of the present invention, the structure of the particular sample assembly 40 that may be utilized in conjunction with the present invention will not be described in further detail herein.

The conduction cooled neutron absorber 10 is formed from a composite material that comprises various constituents that provide the conduction cooled neutron absorber 10 with various advantageous properties and characteristics. More specifically, the composite material may comprise a first material or constituent component having a large thermal neutron cross-section, such as for example, a thermal neutron cross-section of at least about 50 barns. This first material or constituent component is dispersed within a second material or constituent component having a high thermal conductivity (e.g., at least about 1 W/cm·K) so that a substantially homogenous mixture of the two materials is formed. Ideally, the particular constituents of the composite material should be stable (e.g., not subject to transmutation) in the expected nuclear environment and should be capable of being formed into the desired shape. Of course, the two materials should be generally non-reactive with one another, so that the resulting composite material is stable.

A suitable material for the first constituent component is hafnium. Hafnium is a good thermal neutron absorber, having a thermal neutron cross-section of about 104 barns. In addition, hafnium is known to be generally stable in the reactor environment. A suitable material for the second constituent component is aluminum. Aluminum has a thermal conductivity of about 2.37 W/cm·K and is also known to be generally stable in the nuclear environment.

Generally speaking, hafnium is not soluble in aluminum. However, various hafnium/aluminum intermetallic phases are soluble in aluminum. Of the various hafnium/aluminum intermetallic phases that may be formed, it is generally preferred to utilize an intermetallic phase having the least amount of hafnium, specifically, hafnium aluminide ($Al_3Hf$). Compositions comprising hafnium aluminide ($Al_3Hf$) in aluminum are stable up to about 25 atomic percent hafnium and up to the melting temperature of aluminum (i.e., about 660° C.).

The amount of hafnium that should be provided in the aluminum may be varied depending on the particular requirements of the system (e.g., on the desired fast-to-thermal ratio of neutrons to be provided), as well as on the particular configuration of the conduction cooled neutron absorber 10. The amount of hafnium that should be provided in a particular design may be determined with the aid of any of a wide range of computer models or simulations. By way of example, in one embodiment, the Monte-Carlo Neutronics-Particle Transport Code known as MCNP (version 1.40) was used to model proposed designs and to provide estimates of the fast-to-thermal neutron ratios that may be achieved by incorporating various amounts of hafnium into the composite neutron absorber material. Briefly, the MCNP computer code is a general purpose Monte-Carlo N-Particle Transport Code that can be used for neutron, photon, electron, or coupled neutron/photon/electron transport modeling. The MCNP computer code is well known in the art and is available from Los Alamos National Laboratory.

Figure 3:
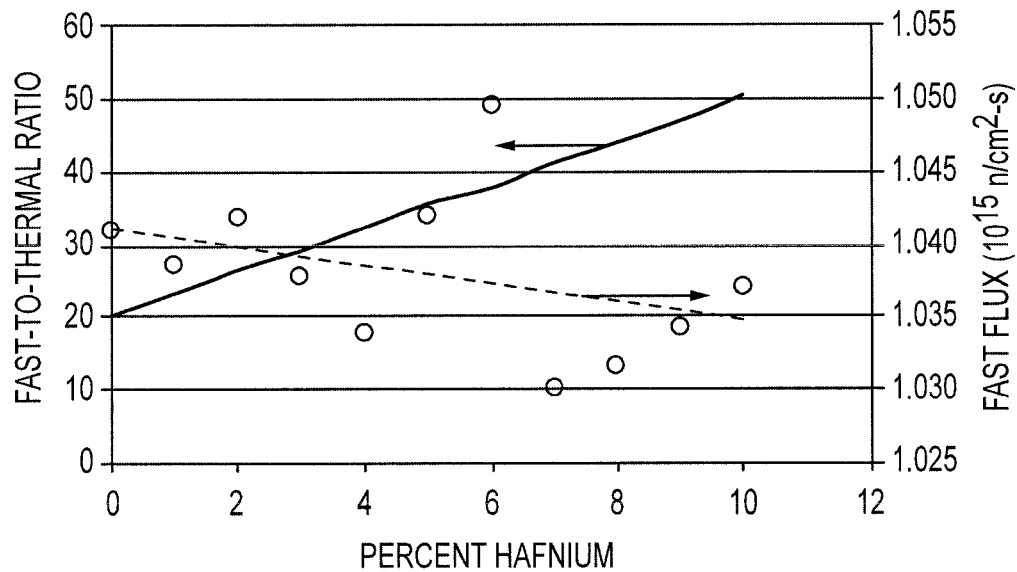
FIG. 3 is a graphical representation of fast-to-thermal neutron ratio and fast flux intensity of a hafnium/aluminum conduction cooled neutron absorber as a function of hafnium.

Referring now primarily to FIG. 3, with continued reference to FIGS. 1 and 2, the MCNP computer code was used to model a conduction cooled neutron absorber 10 having three bores 18 therein for receiving the sample material 14. The MCNP computer code was then used to generate a plot of the fast-to-thermal neutron ratio and fast flux intensity that would exist in the bores 18 for hafnium/aluminum composite materials comprising various amounts of hafnium. For example, and as illustrated in FIG. 3, the conduction cooled neutron absorber 10 will perform well and achieve fast-to-thermal neutron ratios of at least about 50 when hafnium is present in aluminum up to about 10 atomic percent. Fast-to-thermal neutron ratios of about 40 can be achieved with hafnium levels of about 7 atomic percent. These amounts of hafnium are well within the stability range of hafnium aluminide in aluminum, as described above.

Figure 4:
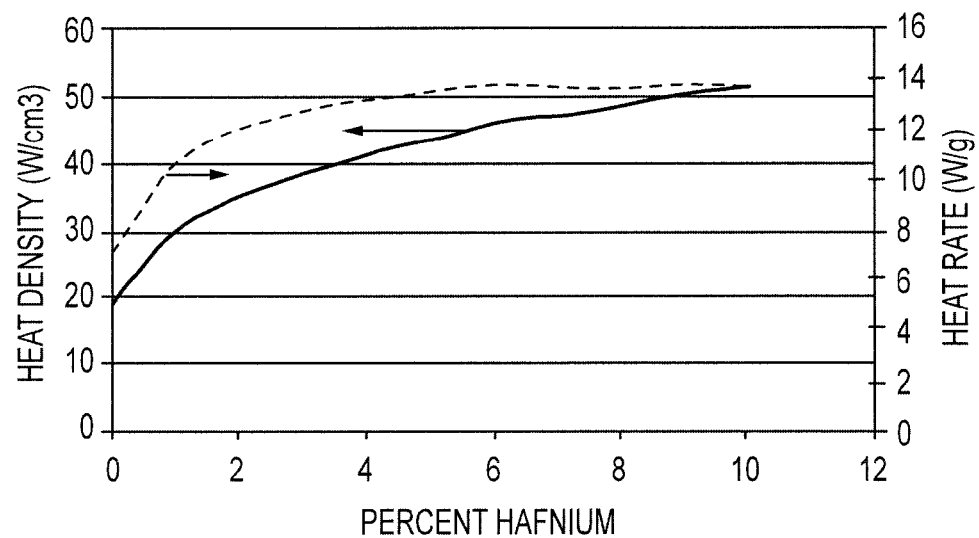
FIG. 4 is a graphical representation of heating rate and heat density of a hafnium/aluminum conduction cooled neutron absorber averaged over the central 40 cm of core height.

Heating rates of the hafnium/aluminum composite material were also modeled and are depicted in FIG. 4. The heating rate, which is a measure of thermal neutron absorption, appears to saturate at about 6-7 atomic percent hafnium, which suggests that hafnium levels of about 6-7 atomic percent are optimum.

Figure 5:
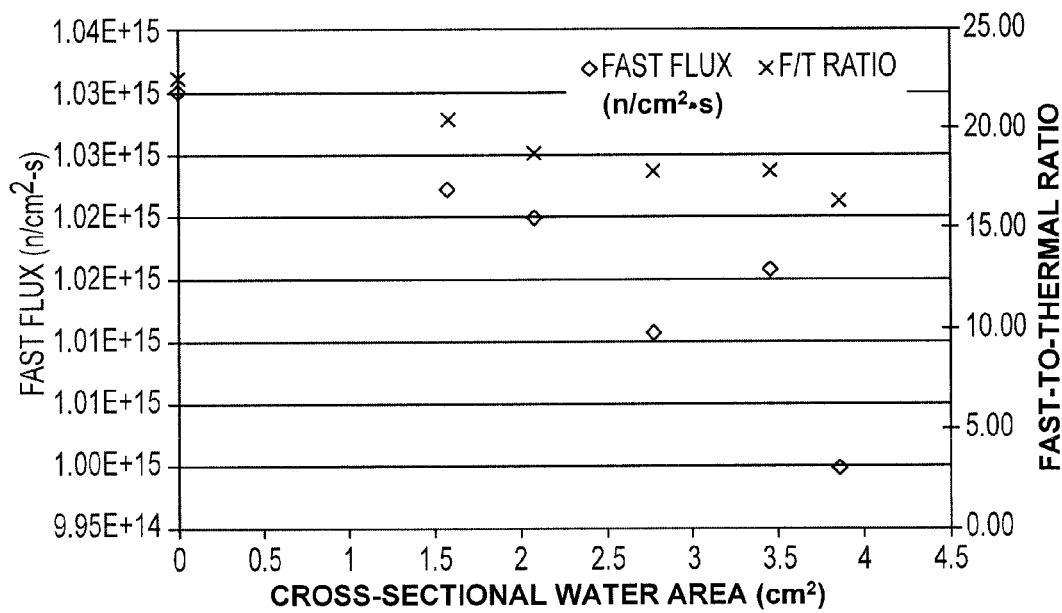
FIG. 5 is a graphical representation of fast-to-thermal neutron ratio and fast flux intensity of the hafnium/aluminum conduction cooled neutron absorber as a function of cross-sectional area of water in the absorber.

It should be noted that the computer simulations depicted in FIGS. 3 and 4 were for a "dry" neutron absorber, i.e., with no coolant channels 20 and no water present as coolant 22. However, and as illustrated in FIG. 5, additional computer analysis with models involving water in various configurations of coolant channels 20 indicates that the system is primarily sensitive to the total amount of water coolant in the system, rather than on the particular arrangement of the coolant channels 20.

As already mentioned, hafnium is not significantly soluble in aluminum. Consequently, a conduction cooled neutron absorber 10 comprising hafnium and aluminum is not amenable to formation by conventional alloying techniques. Consequently, such hafnium/aluminum composite materials must be formed by other techniques. In one embodiment, the hafnium/aluminum composite material is formed by mixing together powders containing hafnium and aluminum powders. The resulting powder mixture may then be consolidated to form the conduction cooled neutron absorber 10. More specifically, and with reference to FIG. 6, a conduction cooled neutron absorber 10 comprising the aluminum/hafnium composite material described herein may be produced by mixing together a hafnium aluminide intermetallic powder 24 (e.g., hafnium aluminide powder, ($Al_3Hf$)) with aluminum powder 26 form a powder mixture 28. The amount of hafnium to be provided in the final conduction cooled neutron absorber 10 product may be controlled by varying the amount of hafnium aluminide intermetallic powder 24 (e.g., $Al_3Hf$) that is mixed with the aluminum powder 26. For example, in order to achieve the atomic percentages of hafnium described herein, the powder mixture 28 may comprise from about 10 volume percent to about 50 volume percent of the hafnium aluminide intermetallic powder 24 with the balance (i.e., from about 90 volume percent to about 50 volume percent) comprising the aluminum powder 26. A hafnium concentration of about 7 atomic percent, wherein the hafnium is provided as $Al_3Hf$, may be achieved with a powder mixture 28 containing about 23 volume percent hafnium aluminide intermetallic powder 24 (e.g., $Al_3Hf$), with the balance (i.e., about 77 volume percent) comprising aluminum powder 26.

The hafnium aluminide intermetallic powder 24 (e.g., $Al_3Hf$) and aluminum powder 26 may be provided in any of a wide range of powder sizes suitable for the particular powder compaction processes that may be utilized to form the conduction cooled neutron absorber 10. Consequently, the present invention should not be regarded as limited to powders 24, 26 having any particular sizes or within any particular range of sizes. However, by way of example, the hafnium aluminide intermetallic powder 24 may be provided having particle sizes in the range of about 45 μm to about 200 μm (i.e., −70 +325 U.S. Tyler mesh). The aluminum powder 26 may be provided having a particle of about 45 nm or less (i.e., −325 U.S. Tyler mesh). However, it should be noted that density differences between the powders 24 and 26 may result in the separation (i.e., unmixing) of the resulting powder mixture 28 if suitable precautions are not taken. For example, hafnium aluminide ($Al_3Hf$) is more than twice as dense as aluminum, so it may be desirable to provide the $Al_3Hf$ in a larger particle size compared to the particle size of the aluminum. The size differential of the particles may reduce the tendency of the particles to separate due to differences in density. Alternatively, other methods may be used to ensure that the hafnium is generally homogenously dispersed within the aluminum in the final conduction cooled neutron absorber 10 product.

Once a suitable powder mixture 28 has been produced, the powder mixture 28 may then be consolidated to form the neutron absorber 10 having the desired configuration. Any of a wide range of consolidation processes or techniques that are now known in the art or that may be developed in the future may be used to consolidate the powder mixture 28 into the desired configuration. For example, the powder mixture 28 may be consolidated by any of a wide range of well-known compaction or hot isostatic pressing processes. Alternatively, the powder mixture 28 may be consolidated by extruding. If desired, the resulting compact may be further consolidated and/or densified by subjecting it to a subsequent sintering step.

Depending on the desired configuration, the conduction cooled neutron absorber 10 may be formed in a single consolidation step. Alternatively, the conduction cooled neutron absorber 10 may be formed by joining together (e.g., by pressure welding) separately formed pieces or components.

Various configurations for the conduction cooled neutron absorber 10 may be modeled in advance of fabrication by utilizing any of a wide range of computer modeling and simulation techniques to test proposed design configurations. For example, a thermal/hydraulic analysis of a proposed design may be conducted by using a finite element analysis computer code, such as ABAQUS® (e.g., version 6.6-3). The ABAQUS® computer code is well known in the art and is available from Dassault Systems, Inc., of Providence, R.I. (US).

Figure 7:
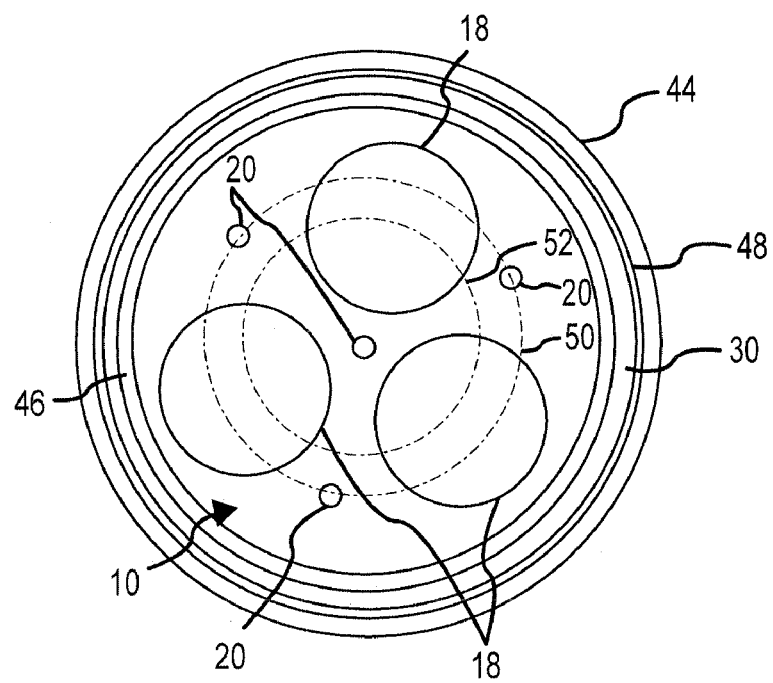
FIG. 7 is an end view of a test cell configuration used for computer modeling results presented herein.

Referring now primarily to FIG. 7, an example configuration of a conduction cooled neutron absorber was modeled to investigate the heat loads and temperature distributions that may be expected in use. More specifically, the computer model was based on the configuration illustrated in FIG. 7, wherein the conduction cooled neutron absorber 10 defines three specimen chambers or bores 18 with four coolant channels 20 arranged in the manner illustrated in FIG. 7. The conduction cooled neutron absorber 10 is surrounded by a pressure tube 30 and an envelope tube 44. A cooling annulus 46 is defined between the pressure tube 30 and the neutron absorber 10, whereas a second annulus 48 is defined between the envelope tube 44 and the pressure tube 30. Second annulus 48 may be filled with helium and is used for the purposes of leak detection.

More specifically, in the configuration modeled, an outside diameter of the conduction cooled neutron absorber 10 is 7.229 cm (3.386 inches). The pressure tube 30 has an inside diameter of 8.753 cm (3.446 inches) and an outside diameter of 9.388 cm (3.696 inches). The envelope tube 44 has an inside diameter of 9.591 cm (3.776 inches) and an outside diameter of 10.226 cm (4.026 inches).

The experiment tubes or bores 18 each have a diameter of 3.17 cm (1.25 inches) and are arranged on circle 50 having a diameter of 4.56 cm (1.795 inches). Each of the coolant channels 20 has a diameter of 6.35 mm (0.25 inch). Three of the coolant channels 20 are located on a 3.09 cm (1.22 inches) circle 52, with the fourth coolant channel 20 being located at the geometric center of the conduction cooled neutron absorber 10. The coolant annulus 46 has a thickness of 0.762 mm (0.030 inch), whereas the second or leak detection annulus 48 has a thickness of 1.016 mm (0.040 inch). For modeling purposes, all components (i.e., the conduction cooled neutron absorber 10, pressure tube 30 and envelope tube 44) have overall lengths of 1.219 m (48 inches).

The conduction cooled neutron absorber 10 comprises hafnium/aluminum composite material comprising about 7 atomic percent hafnium. Both the pressure tube 30 and envelope tube 44 comprise INCONEL® 600.

In the model, coolant water to the cooling annulus 46 and the coolant channels 20 is provided at a pressure of about 12.4 MPa (1800 psia) and has an inlet temperature of 110° C. (230° F.). The flow rate of the water coolant through the coolant annulus 46 was selected to be 90 L/m (23.8 gpm), whereas the rate through the coolant channels 20 was set at 116.9 L/m (30.9) gpm. The cooling annulus 46 and water channel 20 mass flow rates were specified as 0.687 kg/s·cm$^2$ (9.76 lbm/s·in$^2$) and 1.464 kg/s·cm$^2$ (20.81 lbm/s·in$^2$), respectively. The total volume of water is 4.076×10$^{-4}$ m$^3$ (24.87 in$^3$), with 0.2532 L (15.45 in$^3$) in the cooling annulus 46 and 0.1544 L (9.422 in$^3$) in the four water channels 20. Oxide layers having a thickness of 12.7 μm (0.0005 inch) are assumed to be present on the surfaces of the conduction cooled neutron absorber 10 that are exposed to the coolant 22 which, in this example, comprised water.

Another computer modeling program, known as "RELAP5-3d," was used to specify the convection boundary conditions at the outside of the envelope tube 44 in order to simulate conditions in the Advanced Test Reactor. Briefly, RELAP5-3d is a computer simulation code that may be used to perform thermal/hydraulic analyses and kinetic modeling of nuclear reactor systems. RELAP5-3d is well known in the art and is available from the Idaho National Laboratory of Idaho Falls, Id. (US). The external surface of envelope tube 44 is cooled by the primary coolant (water) of the Advanced Test Reactor flowing at a velocity of 13.59 m/s (44.6 ft/s) with an average coolant temperature of 82.2° C. (180° F.). To facilitate specification of heat loads, the geometry of the conduction cooled neutron absorber 10 was partitioned into twelve axial sections with six 10.16 cm (4 inch) sections above and below the core mid-plane.

Figure 8:
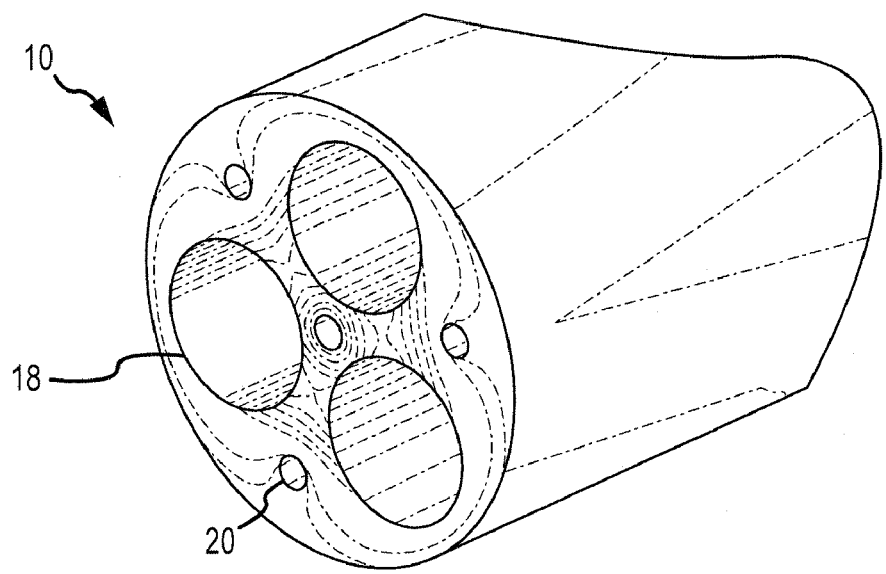
FIG. 8 is a perspective view of a computer-generated isothermal plot showing the internal temperature distribution of a conduction cooled neutron absorber contained in the test cell configuration of FIG. 7.

FIG. 8 is a perspective view of a computer-generated isothermal plot showing the internal temperature distribution of the conduction cooled neutron absorber 10 contained in the test cell configuration of FIG. 7. The temperature in the conduction cooled neutron absorber 10 reaches a maximum of about 224.2° C. (about 435.6° F.) in the regions between the bores 18 at about the center of the envelope tube 44, i.e., about 61 cm (about 24 inches) from either end of the conduction cooled neutron absorber 10.

The calculated average heat loads for each component modeled are presented in Table 1:

TABLE 1

| Component | Average Heat Load (kW) | Heat Flux Condition |
|---|---|---|
| Experiment Tubes | 70 each/210 total | Surface |
| Neutron Absorber | 40.3 | Body |
| Pressure Tube | 58.32 | Body |
| Envelope Tube | 70.5 | Body |
| Water Channels | 3.741 | Body |
| Water Annulus | 6.135 | Body |

The computer water channel outlet temperatures are presented in Table 2:

TABLE 2

| Location | $T_{max}$ (° C./° F.) |
|---|---|
| Water Annulus | 142.7/288.8 |
| Center Water Channel | 135.6/276.1 |
| Off-Center Water Channels (3) | 124.9/256.8 |

In summation, the proposed design of the conduction cooled neutron absorber 10 is capable of maintaining all system components below their maximum temperature limits. The maximum temperature of the conduction cooled neutron absorber 10 is about 224.2° C. (435.6° F.) and occurs in a small, localized region of the conduction cooled neutron absorber 10 near the core mid-plane (e.g., about 61 cm (about 24 inches)) from either end of the neutron absorber 10, which is well below the melting temperature of aluminum (about 660° C.). The total coolant flow rate requirement for the modeled configuration is about 207 L/m (about 54.7 gpm). If desired, the design could be further refined to reduce the amount of water coolant required, which should serve to increase the fast-to-thermal neutron ratio in the experiment locations (e.g., within bores 18).

Figure 9:
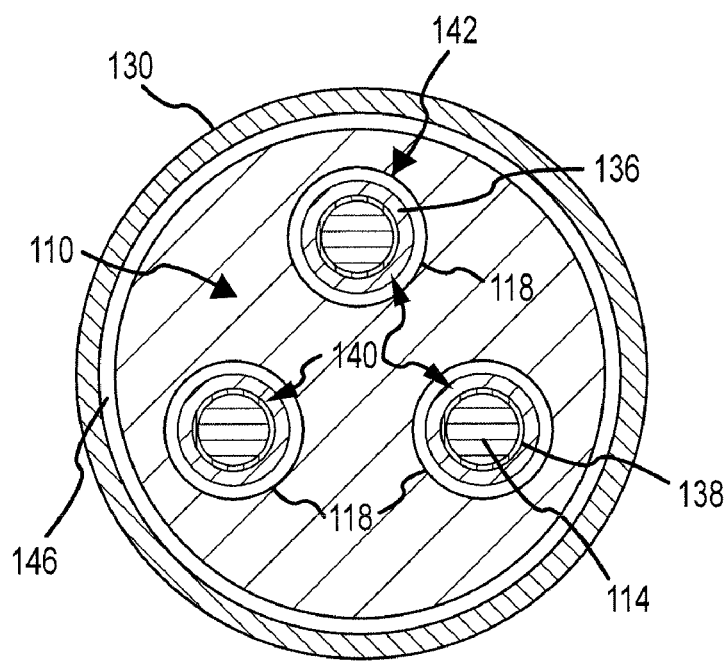
FIG. 9 is an end view of a second embodiment of a conduction cooled neutron absorber.

As mentioned above, other variations are possible and may also be used. For example, a second embodiment of a conduction cooled neutron absorber 110 is illustrated in FIG. 9 and differs from the conduction cooled neutron absorber 10 in that the conduction cooled neutron absorber 110 is not provided with any coolant channels therein. Instead, the conduction cooled neutron absorber 110 is provided with a cooling annulus 146 adjacent a pressure tube 130. Sample material assemblies 140 containing sample material 114 may be provided in various bores 118 provided in the conduction cooled neutron absorber 110. In the embodiment illustrated in FIG. 9, the sample material 114 may be surrounded by a jacket 136 and a thermal bonding agent 138 in the manner already described for the first embodiment. The jacket 136 may be sized so that an annulus 142 is created between the sample material assemblies 140 and the bores 118. Annulus 142 may receive a temperature control gas (not shown), such as a mixture of helium and neon, to act as a thermal interface between the sample material 114 and the conduction cooled neutron absorber 110. Alternatively, such an annulus 142 need not be provided.

Figure 10:
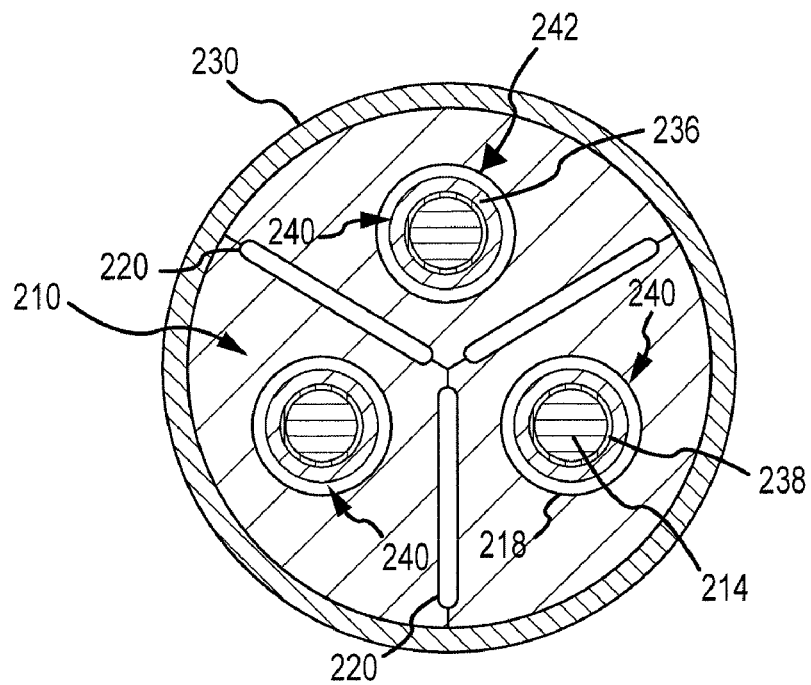
FIG. 10 is an end view of a third embodiment of a conduction cooled neutron absorber.

A third embodiment of a conduction cooled neutron absorber 210 is illustrated in FIG. 10 and may instead utilize three high aspect ratio cooling channels 220 arranged in a "Y" configuration in the manner illustrated in FIG. 10. Note that a separate annular cooling channel is not provided between the conduction cooled neutron absorber 210 and pressure tube 230, although such an arrangement is possible. Sample material assemblies 240 may comprise a structural arrangement basically identical to those already described. That is, each sample material assembly 240 may comprise a quantity of sample material 214 surrounded by a jacket 236 with a thermal bonding agent 238 therebetween. The sample material assemblies 240 may be sized so that an annulus 242 is defined between the sample material assemblies 240 and bores 218 provided in the conduction cooled neutron absorber 210. A temperature control gas (not shown), such as a mixture of helium and neon, may be caused to flow through annulus 242 during operation.

Figure 11:
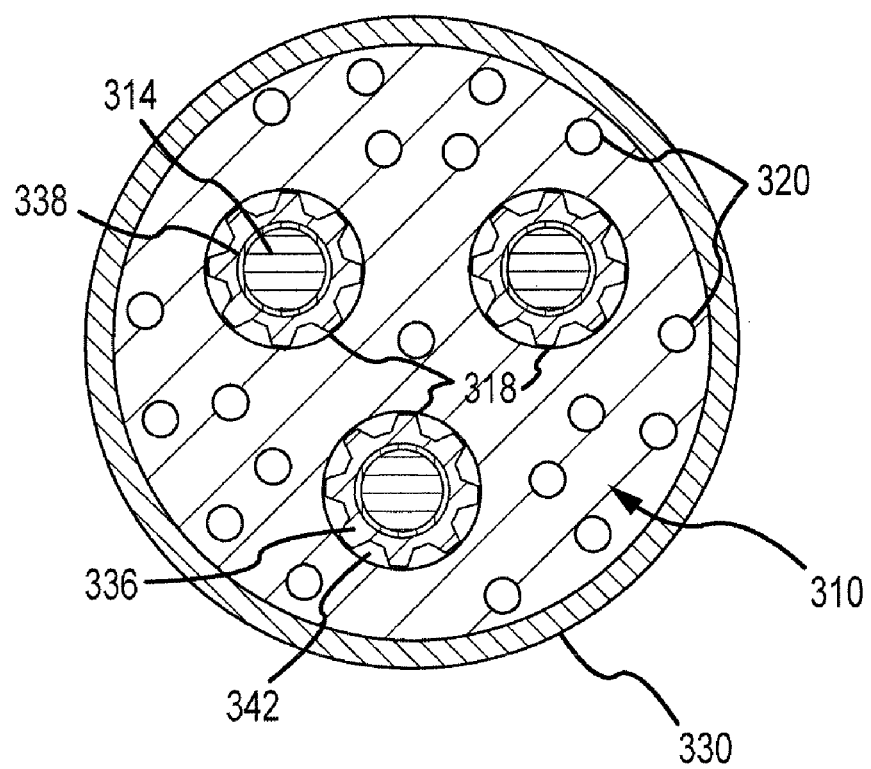
FIG. 11 is an end view of a fourth embodiment of a conduction cooled neutron absorber.

Still yet other variations and configurations of the conduction cooled neutron absorber are possible. For example, a fourth embodiment of a conduction cooled neutron absorber 310 illustrated in FIG. 11 may comprise a plurality of smaller coolant channels 320 provided in the arrangement shown in FIG. 11. Like the embodiment illustrated in FIG. 10, an annular coolant channel is not provided adjacent a pressure tube 330, although such a coolant annulus could be provided. In a departure from the other embodiments already described, a sample material 314 of the fourth embodiment of the conduction cooled neutron absorber 310 may be provided within a star-shaped jacket 336 that is sized to contact the interior surface of bore 318. The star-shaped jacket 336 thereby provides a direct heat path (e.g., by contact) between the material 314 and the conduction cooled neutron absorber 310. A thermal bonding agent 338 may be provided between sample material 314 and jacket 336. A temperature control gas (e.g., a helium/neon mixture) may be caused to flow in spaces 342 between the star-shaped jacket 336 and bore 318, if desired.

Having herein set forth preferred embodiments of the present invention, it is anticipated that suitable modifications can be made thereto which will nonetheless remain within the scope of the invention. The invention shall therefore only be construed in accordance with the following claims.

The invention claimed is:

1. A method for absorbing neutrons, comprising:
positioning a plurality of sample materials in a neutron absorber comprising:
disposing each sample material of the plurality of sample materials in one jacket of a plurality of jackets;
disposing each jacket in one discrete, cylindrical bore of a plurality of discrete, cylindrical bores formed in a cylindrical heat sink of the neutron absorber and extending through an entirety of the neutron absorber along a longitudinal axis of the neutron absorber; and
positioning each jacket within each discrete bore to form an annulus extending along an entire length of the sample material between the jacket and a surface of the heat sink forming the discrete bore;
positioning the neutron absorber in a neutron field;
exposing the neutron absorber to the neutron field;
absorbing at least some of the neutrons from the neutron field with the neutron absorber;
flowing a coolant through a plurality of discrete coolant channels formed in the cylindrical heat sink separate from the plurality of discrete bores and extending through an entirety of the neutron absorber along the longitudinal axis of the neutron absorber; and
removing heat from the neutron absorber with the coolant.

2. The method of claim 1, wherein exposing the neutron absorber to the neutron field comprises exposing the neutron absorber to the neutron field including fast neutrons comprising neutrons exhibiting an energy greater than about 0.1 million electron volts (MeV) and thermal neutrons comprising neutrons exhibiting an energy less than about 0.68 electron volts (eV), and further comprising producing a region adjacent the neutron absorber exhibiting a fast-to-thermal neutron ratio of at least about 15 by absorbing a portion of the thermal neutrons with at least one material forming the neutron absorber.

3. The method of claim 2, further comprising producing a region adjacent the neutron absorber exhibiting a neutron flux intensity of at least about $1\times10^{15}$ n/cm$^2$·s by absorbing a portion of the thermal neutrons with the at least one material forming the neutron absorber.

4. The method of claim 2, further comprising producing a region adjacent the neutron absorber exhibiting a fast-to-thermal neutron ratio in a range of about 15 to about 50 and a neutron flux intensity of at least about $1\times10^{15}$ n/cm$^2$·s by absorbing a portion of the thermal neutrons with the at least one material forming the neutron absorber.

5. A method for absorbing neutrons, comprising:
positioning a plurality of sample materials in a neutron absorber comprising:
disposing each sample material of the plurality of sample materials in a jacket;
disposing the jacket in a bore formed in a heat sink of the neutron absorber; and
positioning the jacket within the bore to form an annulus extending along an entire length of the sample material between the jacket and a surface of the heat sink forming the bore;
positioning the neutron absorber in a neutron field;
exposing the neutron absorber to the neutron field;
absorbing at least some of the neutrons from the neutron field with the neutron absorber;
flowing a coolant through a portion of the neutron absorber;
removing heat from the neutron absorber with the coolant; and
forming the neutron absorber from a first material comprising hafnium and a second material comprising aluminum.

6. The method of claim 5, wherein forming the neutron absorber from a first material comprising hafnium and a second material comprising aluminum comprises selecting the first material to comprise a hafnium/aluminum intermetallic compound.

7. The method of claim 6, wherein selecting the first material to comprise a hafnium/aluminum intermetallic compound comprises selecting the first material to comprise $Al_3Hf$.

8. The method of claim 5, further comprising forming the neutron absorber from a first material exhibiting a thermal neutron cross-section of at least about 50 barns, and a second material exhibiting a thermal conductivity of at least about 1 W/cm·K.

9. The method of claim 1, wherein flowing a coolant through a plurality of discrete coolant channels formed in the cylindrical heat sink comprises flowing water through the plurality of discrete coolant channels formed in the cylindrical heat sink.

10. A method for absorbing neutrons, comprising:
positioning a neutron absorber having at least one sample material disposed in a plurality of bores formed therein in a neutron field;
exposing the neutron absorber to the neutron field including fast neutrons comprising neutrons exhibiting an energy greater than about 0.1 million electron volts (MeV) and thermal neutrons comprising neutrons exhibiting an energy less than about 0.68 electron volts (eV);
producing a region of the neutron absorber proximate to the at least one sample material exhibiting neutron radiation having a fast-to-thermal neutron ratio of at least 15 by absorbing a portion of the thermal neutrons with at least one material forming the neutron absorber;
flowing a coolant through a plurality of discrete channels extending through an entirety of the neutron absorber along a longitudinal axis thereof remote from the plurality of bores formed in the neutron absorber; and
removing heat from the neutron absorber with the coolant.

11. The method of claim 10, wherein positioning a neutron absorber comprises positioning the neutron absorber formed from a hafnium and aluminum composite material.

12. The method of claim 5, further comprising forming the neutron absorber from a powder mixture comprising hafnium and aluminum.

13. The method of claim 1, further comprising flowing a coolant through an annulus formed in the neutron absorber extending around at least one sample material.

14. The method of claim 1, wherein positioning a plurality of sample materials in a neutron absorber further comprises disposing a temperature control gas comprising at least one of helium and neon in each annulus formed between each jacket and each bore.

15. The method of claim 1, further comprising disposing the heat sink within a pressure tube.

16. The method of claim 15, wherein disposing the heat sink within a pressure tube comprises positioning the heat sink within the pressure tube to form a cooling annulus between the heat sink and the pressure tube.

17. The method of claim 15, wherein disposing the heat sink within a pressure tube comprises disposing the pressure tube within an envelope tube.

18. The method of claim 17, wherein disposing the heat sink within a pressure tube further comprises positioning the pressure tube within the envelope tube to form an annulus between the pressure tube and the envelope tube.

19. The method of claim 18, wherein disposing the heat sink within a pressure tube further comprises disposing helium within the annulus formed between the pressure tube and the envelope tube.

* * * * *

UNITED STATES PATENT AND TRADEMARK OFFICE
CERTIFICATE OF CORRECTION

PATENT NO. : 8,229,054 B2  
APPLICATION NO. : 12/184136  
DATED : July 24, 2012  
INVENTOR(S) : Donna P. Guillen et al.

Page 1 of 1

It is certified that error appears in the above-identified patent and that said Letters Patent is hereby corrected as shown below:

In the specification:
COLUMN 6, LINE 48, change "in the" to --In the--

Signed and Sealed this
Twentieth Day of October, 2015

Michelle K. Lee
*Director of the United States Patent and Trademark Office*